Figure 1:
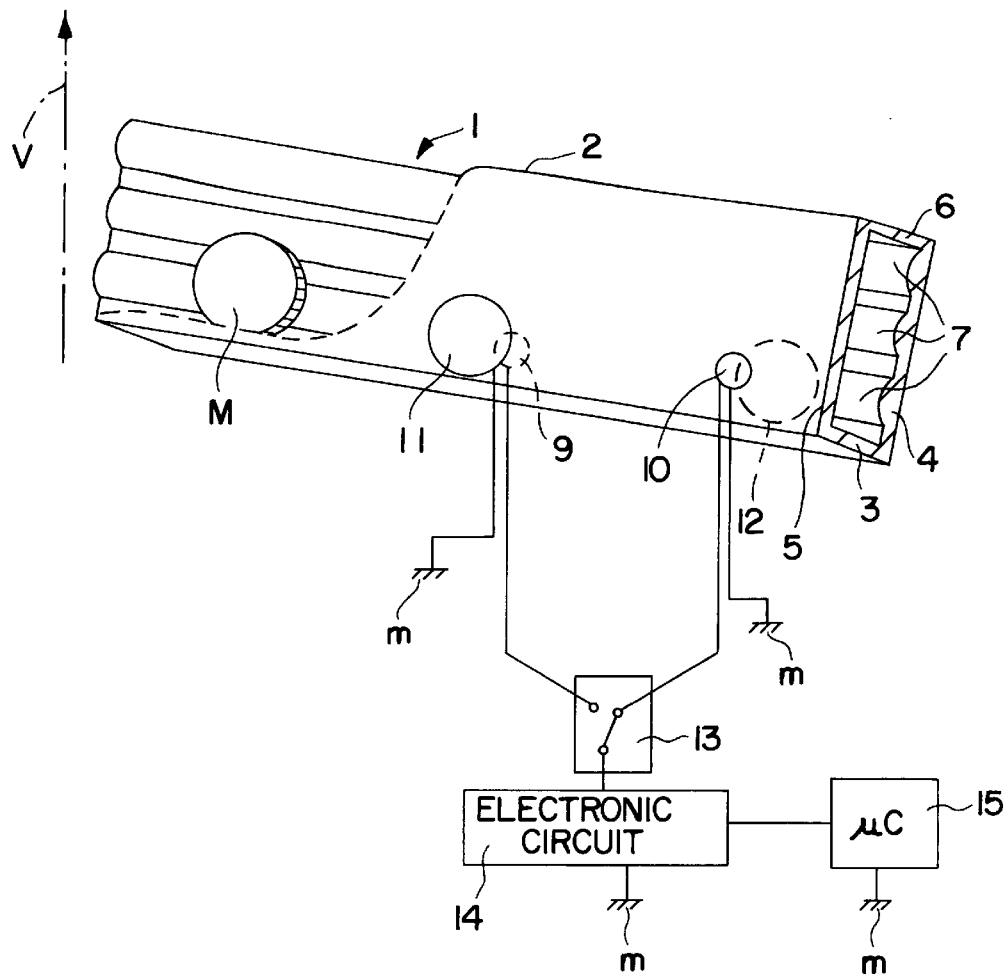

United States Patent [19]
Seitz et al.

[11] Patent Number: 6,145,646
[45] Date of Patent: Nov. 14, 2000

[54] DEVICE FOR CHECKING THE AUTHENTICITY OF COINS, TOKENS OR OTHER FLAT METAL OBJECTS

[75] Inventors: Thomas Seitz; Joseph Rueff, both of Geneva, Switzerland

[73] Assignee: Electrowatt Technology Innovation AG, Zug, Switzerland

[21] Appl. No.: 09/155,444

[22] PCT Filed: Apr. 2, 1997

[86] PCT No.: PCT/EP97/01663

§ 371 Date: Nov. 16, 1998

§ 102(e) Date: Nov. 16, 1998

[87] PCT Pub. No.: WO97/38400

PCT Pub. Date: Oct. 16, 1997

[30] Foreign Application Priority Data

Apr. 3, 1996 [CH] Switzerland ............. 0869/96

[51] Int. Cl.[7] ............................. G07D 5/08
[52] U.S. Cl. ......................... 194/317; 324/236
[58] Field of Search ................... 194/206, 317, 194/318, 319; 324/236

[56] References Cited

U.S. PATENT DOCUMENTS

| 3,918,563 | 11/1975 | Schwippert et al. ............ 194/318 |
| 4,086,527 | 4/1978 | Cadot .......................... 324/233 |
| 4,469,213 | 9/1984 | Nicholson et al. ............ 194/320 |
| 5,433,310 | 7/1995 | Bell ............................ 194/318 |

FOREIGN PATENT DOCUMENTS

| 0 704 825 A1 | 4/1996 | European Pat. Off. . |
| 2455112 | 5/1975 | Germany . |
| 2 069 211 | 8/1981 | United Kingdom . |
| 2 287 341 | 9/1995 | United Kingdom . |

*Primary Examiner*—F. J. Bartuska
*Attorney, Agent, or Firm*—Proskauer Rose LLP

[57] ABSTRACT

An apparatus for testing the authenticity of coins, tokens or other flat metal articles includes a coin passage with a lower and an upper side wall. A coin moves in a condition of bearing against the lower side wall along the coin passage past at least one inductive measuring element having a coil (S). The coil (S) can be fed with a first current ($I_1$) from a first current of voltage source (19) and a second current ($I_2$) from a second current or voltage source (21). A capacitive element ($C_1$) is connected between the coil (S) and the first current or voltage source (19) so that the coil(S) and the capacitive element ($C_1$) form an impedance ($Z_1$). The phase shift ($\phi_1$) between the first current ($I_1$) and the voltage across the impedance ($Z_1$) serves as a criterion for acceptance or rejection of the coin.

10 Claims, 2 Drawing Sheets

DEVICE FOR CHECKING THE AUTHENTICITY OF COINS, TOKENS OR OTHER FLAT METAL OBJECTS

The invention relates to an apparatus for testing the authenticity of coins, tokens or other flat metal articles, of the kind set forth in the classifying portion of claim 1.

Such apparatuses are suitable for example as coin collection units in public telephone stations, automatic sales machines, energy meters and so forth.

An apparatus for testing the authenticity of coins, of the kind set forth in the classifying portion of claim 1, is known from DE 24 55 112 and GB 2 287 341. The apparatus has an inductive measuring element which is acted upon by two different frequencies $f_1$ and $f_2$, as there are coins which deliver a measurement signal that can be easily measured and distinguished from other coins when the frequency $f_1$ is comparatively low, while there are also coins which cannot be easily distinguished from other coins at that low frequency $f_1$, but at a higher frequency $f_2$. The measuring element comprises an inductive transmitter and an inductive receiver which are arranged on mutually opposite sides of a coin passage. The transmitter includes a core which has two coils wound around it. The coils are excited independently of each other at different frequencies so that an alternating magnetic field oscillates at two different frequencies in the coin passage. Filters are connected downstream of the receiver which is also in the form of a coil in order to measure the amplitudes of the signals induced in the receiver at the two frequencies. Such an apparatus represents a mechanically and electrically complicated structure.

GB 2 069 211 discloses an apparatus for testing the authenticity of coins, in which the phase shift between the voltage across the measuring coil and a reference voltage is measured.

European patent application EP 704 825 which is not a prior publication discloses an apparatus for testing the authenticity of coins, in which a coil arranged in a series resonance circuit serves as an inductive measuring element for determining the alloy composition or the thickness of the coin.

The problem of the present invention is that of providing an apparatus for testing the authenticity of coins, in which it is possible to achieve a high selection capability as between different coins, with a simple inductive measuring element.

According to the invention the specified problem is solved by the features of claim 1.

The invention proposes an apparatus having an inductive measuring element, in which the coin is exposed to an alternating magnetic field at least two frequencies. The measuring element has a single coil which is fed from two sources with currents or voltages of different frequency: the coil is at the same time part of two different circuits. In at least one circuit the phase shift between the current supplied by the source and the voltage across the coil serves as the measurement signal. To increase the level of sensitivity of measurement of the phase shift, provided in the corresponding circuit is a capacitor.

According to the invention the specified problem is solved by the features of claim 1.

The invention proposes an apparatus having an inductive measuring element, in which the coin is exposed to an alternating magnetic field at least two frequencies. The measuring element has a single coil which is fed from two sources with currents or voltages of different frequency: the coil is at the same time part of two different circuits. In at least one circuit the phase shift between the current supplied by the source and the voltage across the coil serves as the measurement signal. To increase the level of sensitivity of measurement of the phase shift, provided in the corresponding circuit is a capacitor with which the zero point of the phase shift, that is to say the value when there is no coin present, can be set to a fixed value.

Figure 2:
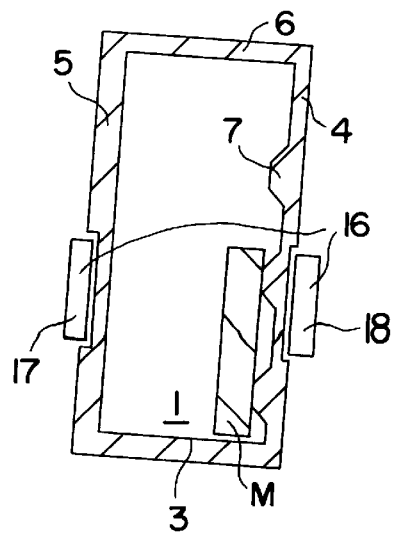
Figure 3:
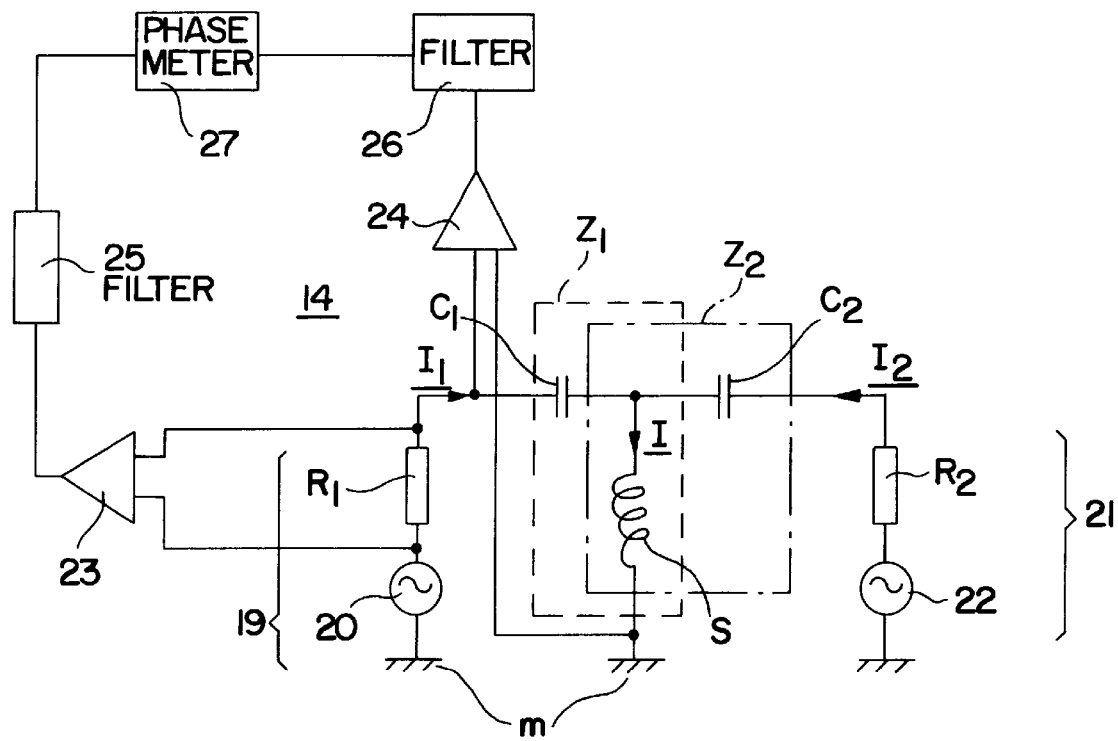
Figure 4:
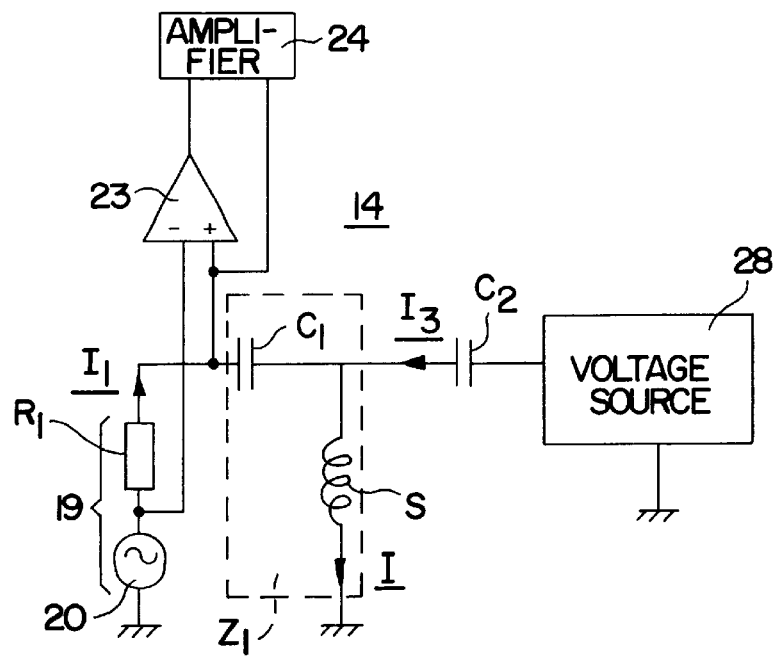

Embodiments of the invention are described in greater detail hereinafter with reference to the drawing, wherein the term coin M is also used hereinafter to denote tokens or other flat metal articles. In the drawing:

FIG. 1 shows a coin passage of a testing apparatus with inductive measuring elements, FIG. 2 shows the coin passage with a further inductive measuring element, FIG. 3 shows a first electronic circuit for operation of the inductive measuring elements, and FIG. 4 shows a second electronic circuit for operation of the inductive measuring elements.

FIG. 1 shows an apparatus for testing the authenticity of coins, tokens or other metal articles, having a coin passage 1 which is preferably in the form of an opening n a body 2 comprising two plastic parts. The coin passage 1 is defined by the bottom 3, lower and upper side walls 4 and 5 respectively, and a top 6. The lower side wall 4 is provided with ribs 7 which are formed thereon and which extend in the direction of movement of the coin M. The coin passage 1 is inclined in the direction of movement of a coin M to be tested and the two side walls 4 and 5 are inclined relative to the vertical V through an acute angle of typically 12° so that the coin M to be tested rolls or slides along the coin passage 1 on the bottom 3 thereof and in so doing ideally lies flat with a side surface thereof against the ribs 7 of the lower side wall 4. The side walls 4 and 5 each have on the side remote from the coin passage 1 openings (not shown) for receiving coils 9 and 10 respectively which are arranged in displaced relationship, and, optionally, metal plates 11, 12. The coil 9 and the plate 12 are disposed at the lower side wall 4, for which reason they are shown in broken line. The plates 11 and 12 are disposed in opposite relationship to the coils 9 and 10 respectively. They are preferably round or quadrangular but they may also be of any other geometrical shape. A respective coil 9, 10 and possibly the metal plate 11 or 12 respectively arranged in the oppositely disposed side wall 5 or 4 form an inductive measuring element. The two coils 9 and 10 have two connections, of which a respective one is taken to a common electrical earth connection m and the other is taken to a switch 13 so that they can be connected to an electronic circuit 14 for electrically mutually independent operation. The apparatus further includes a control and evaluation unit 15, for example in the form of a microprocessor, for evaluation of the output signal supplied by the electronic circuit 14 and for control of the apparatus. The circuit 14 and the microprocessor 15 are designed in such a way as to derive from the signals measured with the coils 9 and 10 discrete values which depend on the alloy or the thickness d of the coin M. The coin M is deemed to be genuine and is accepted by the testing apparatus only if those values coincide with predetermined values, within predetermined tolerances, otherwise the coin is rejected.

The microprocessor 15 controls the switch 13 so that the signals which occur in succession in respect of time in the coils 9 and 10 when the coin M passes through the apparatus can be measured with a single electronic circuit 14. Instead of the switch 13 and the circuit 14 which is common to the two coils 9 and 10 however it is also possible to provide a respective specific circuit 14 for each of the coils 9 and 10 so that the operating conditions for the two coils 9 and 10 can be selected separately and in the optimum fashion.

The coil 9 is disposed at the lower side wall 4 against which the coin M moves along the coin passage, so that the spacing between the coil 9 and the side surface of the coin M is fixedly predetermined and is for example 1.1 mm. The coin M is produced in terms of material either from a single alloy or from a plurality of alloys. The internal resistance $R_9$ of the coil 9, which is measured when the coin M is present, approximately exclusively depends on the material of the coin M, with a suitable choice of the frequency f of the current flowing through the coil 9.

The spacing between the coil 10 and the coin M is dependent on the thickness d thereof. In the case of the coil 10 therefore the internal resistance $R_{10}$ depends not only on the material of the coin M but also its thickness d. If the alloy of the coin M is known the thickness d of the coin M can be clearly determined.

In order to avoid the diameter of the coin M having an influence on the measurements of the thickness d and the alloy composition, the diameter selected for the coils 9 and 10 is smaller than the diameter of the smallest coin M to be measured and the coil is arranged on the side wall 4 or 5 of the coin passage 1 at a suitable height so that therefore the smallest coin M to be tested briefly completely covers the coil while it is passing through. The diameter of the coil is for example 11 mm. The resistance of the feed wires is comparatively low. Suitable coils 9, 10 are in particular wound coils with a ferrite core.

Instead of the individual coils 9 and 10, with or without oppositely disposed metal plates 11 and 12 respectively, a single double coil 16 can also serve as the inductive measuring element, as shown in FIG. 2. The double coil 16 comprises two individual coils 17 and 18 which are arranged at both sides of the coin passage 1 and which are wound in opposite directions and which are electrically connected in series so that the magnetic field they produce, within the coin passage 1, is substantially parallel to the side walls 4 and 5.

The coils 9 and 10 (FIG. 1) with or without oppositely disposed metal plates 11 and 12 respectively, as well as the double coil 16 (FIG. 2) represent a respective inductive measuring element. When the coin M passes through, the electrical properties of the inductive measuring element are temporarily changed as a result of the physical interactions between the corresponding coil 9, 10 or 16 respectively and the coin M. The inductive measuring element is operated by the electronic circuit 14 and represents for same an electrical impedance $Z_S$. The reference S is used hereinafter for the corresponding coil 9, 10 or 16 respectively of the inductive measuring element.

The coil S can be electrically characterized by an inductance $L_S$ and an ohmic internal resistance $R_s$. Its impedance is therefore $Z_S = i*2*\pi*f*L_S + R_S$, wherein i denotes the imaginary unit and f denotes the frequency. The internal resistance $R_S$ contains a static component $R_{S,DC}$ and a dynamic component $R_{S,AC}(f)$ which depends on the frequency f of the current flowing through the coil S, the physical properties of the coin M, the geometry of the coil S, the metal plates 11, 12 (FIG. 1) if present, and, in the case of an inductive measuring element with individual coils (9; 10), in particular, the spacing between the individual coil (9; 10) and the coin M. As soon as the coin M, in rolling along the coin passage 1, passes into the measuring region of the coil S, its internal resistance $R_S$ increases.

FIG. 3 shows a first embodiment of the electronic circuit 14. The first terminal of the coil S is connected to earth m, while the second terminal of the coil S is connected by way of a first capacitive element in the form of a capacitor $C_1$ to a first current source 19 which supplies an alternating current $I_1$ of approximately constant amplitude and of the frequency $f_1$. The current source 19 is formed from a first ac voltage source 20 and a first resistor $R_1$ which is of high resistance in comparison with the value of the impedance $Z_S$ of the coil S. A terminal of the current source 19 is connected to earth m.

The second terminal of the coil S is further connected by way of a second capacitor $C_2$ to a second current source 21 which supplies an alternating current $I_2$ of approximately constant amplitude and of the frequency $f_2$. The second current source 21 is formed from an ac voltage source 22 and a second resistor $R_2$ which is also of high resistance in comparison with the value of the impedance $Z_S$ of the coil S. A terminal of the current source 21 is also connected to earth m.

The internal resistance of the current sources 19 and 21 respectively is of such a value that the current $I_1$ produced by the current source 19 flows primarily through the coil S and not through the current source 21, and vice versa. Therefore approximately the total current $I = I_1 + I_2$ flows through the coil S.

The inductance $L_S$ of the coil S is typically 0.5–2 mH. With a frequency of the exciting current in the region of about 5 to 100 kHz, its internal resistance $R_{S,AC}$ is about 20–250 Ω, while with higher frequencies in the region of about 1 MHz its internal resistance $R_{S,AC}$ is a few kΩ. In a first embodiment the ac voltage source 20 produces a voltage at a frequency $f_1$ of about 1–10 kHz and the ac voltage source 22 produces a voltage at a frequency $f_2$ of about 50–200 kHz. In a second embodiment the frequencies $f_1$ and $f_2$ are about 50–200 kHz and 1 MHz respectively. The frequency $f_2$ is about one to two orders of magnitude greater than the frequency $f_1$.

The coil S represents the complex impedance $Z_S$, that is to say the current $I_1$ flowing through the coil S and the voltage across the coil S, which is induced by virtue of the current $I_1$ in the coil S, have a phase shift $\phi_1$ which is given by $$\varphi_1 = \arctan\frac{2\pi f_1 L_S}{R_S}.$$

As long as the numerator is great in relation to the denominator and remains great when the coin M passes through the arrangement, the phase shift $\phi_1$ when the coin M passes through can scarcely be measured. By means of the capacitor $C_1$ connected for the current $I_1$ in series with the coil S however it is possible to form an impedance $Z_1$ comprising the coil S and the capacitor $C_1$, in which the phase shift $\phi_1$ between the current $I_1$ flowing through the impedance $Z_1$ and the voltage across the impedance $Z_1$ can be easily measured. Because of the relationship $$\phi_1 = \arctan\frac{2\pi f_1 L_S - \frac{1}{2\pi f_1 C_1}}{R_S}$$

the zero point $\phi_{1,0}$, that is to say the value of the phase shift $\phi_1$ when coins M are absent or when a coin M of a predetermined kind of coin is present, can be adjusted as desired by way of the value of the capacitor $C_1$. The value $C_1$ is for example so selected that the zero point $\phi_{1,0}$ is 45° so that the arctan function at 45° has the greatest gradient. The zero point $\phi_{1,0}$ can however also be of the value 0° or any other value.

For the purposes of measuring the phase shift $\phi_1$ the current $I_1$ flowing through the impedance $Z_1$ is transformed into a voltage $U_{R1}$ for example by means of an operational amplifier 23 whose two inputs are connected to the two terminals of the resistor $R_1$. The voltage $U_{Z1}$ across the impedance $Z_1$ is tapped off by means of a further operational amplifier 24. The voltages $U_{R1}$ and $U_{Z1}$ at the outputs of the operational amplifiers 23 and 24 respectively are fed by way of respective filters 25 and 26 to a phase meter 27 which outputs as its output signal a signal that is proportional to the phase shift $\phi_1$. The filters 25 and 26 are of such sizes that voltage signals at the frequency $f_1$ are transmitted while signals at the frequency $f_2$ are filtered out. Measurement of the phase shift $\phi_1$ can also be effected in another manner.

The coil S and the capacitor $C_2$ form a second impedance $Z_2$. The phase shift $\phi_2$ between the current $I_2$ and the voltage $U_{Z2}$ across the impedance $Z_2$ can be measured in an analog mode, in which respect the corresponding electronic elements such as amplifiers and phase meter are not shown in the drawing for the sake of enhanced clarity thereof. The frequency $f_1$ is preferably in the range of 1 to 10 kHz and the frequency $f_2$ is preferably in the range of 50 to 200 kHz. The frequency $f_2$ may however also assume values which extend into the MHz-range.

Therefore this circuit 14 can be used to measure for each coin M the phase shifts $\phi_1$ and $\phi_2$ induced by the coin. If necessary the values of the impedances $Z_1$ and $Z_2$ can be determined as further parameters characterising the coin M.

The capacitive elements $C_1$, $C_2$ serve to reduce the imaginary part of the impedances $Z_1$ and $Z_2$ respectively to a respective value at which a change caused by the coin M can be measured with a high degree of accuracy. The values of the impedances $Z_1$, $Z_2$ are therefore smaller than the value of the impedance $Z_S$ of the coil S alone.

FIG. 4 shows a second embodiment of the electronic circuit 14. The current source 21 is replaced by a circuit 28 which acts as a voltage source and which on the one hand always holds the series resonance circuit formed from the coil S and the capacitor $C_2$ in a condition of resonance at the resonance frequency $f_2 = f_R$ and which on the other hand excites the series resonance circuit with a voltage of a predetermined fixed amplitude so that the current $I_3$ flowing through the series resonance circuit is proportional to the internal resistance $R_{SAC}(f_R)$. As the series resonance circuit is in resonance, the impedance of the series resonance circuit, which is operative for the current $I_3$, is ohmic. Such a circuit 28 and evaluation of the signal supplied thereby are described in European patent application EP 704 825. The output signal of the circuit 28 is proportional to the current $I_3$ and thus to the ohmic internal resistance $R_{SAC}(f_R)$, which changes when the coin M passes through. The current $I_3$ therefore also serves as a criterion in regard to acceptance or rejection of the coin M.

This second electronic circuit 14 can be used to measure a total of four values which are characteristic in respect of the coin M, namely the phase shift $\phi_1$, the value of the impedance $Z_1$, the ohmic internal resistance $R_{SAC}(f_R)$ of the coil S and the resonance frequency $f_R$, or values derived therefrom. The capacitive elements $C_1$ and $C_2$ are advantageously of such sizes that the current $I_1$ has a low frequency $f_1$ of a few kHz and that the resonance frequency $f_R$ is greater by one to two orders of magnitude than the frequency $f_1$.

So that the series resonance circuit formed by the coil S and the capacitor $C_2$ is not damped by the circuit including the current source 19, it is necessary for the current source 19 to be of high resistance in comparison with the coil S.

If the double coil 16 (FIG. 2) is used as the inductive measuring element, the individual coil 17 arranged on the lower side wall 4 is advantageously wound from stranded wire which is of low resistance in comparison with a normal wire so that its internal resistance $R_{SAC}$ is as low as possible.

What is common to both embodiments is that on the one hand the coil S is connected in series with a capacitive element with which it jointly forms an electrical impedance which is fed with a first current from a current source, and that the phase shift between the first current and the voltage across the impedance serves as a criterion in regard to acceptance or rejection of the coin. On the other hand the coil S is additionally supplied with a second current from a second current or voltage source, for measuring further parameters of the coin. Measurement of the phase shift and the further parameters is effected in that case virtually independently of each other.

What is claimed is:

1. Apparatus for testing the authenticity of coins (M), tokens or other flat metal articles, which has an inductive measuring element with a coil for characterizing the coin, wherein the coil can be fed with a first current from a first current or voltage source and wherein a phase shift which serves as a criterion for acceptance or rejection of the coin is measured, characterized in that the coil can be fed with a second current from a second current or voltage source, that a capacitive element $C_1$ is connected between the coil and the first current or voltage source, the coil and the capacitive element $C_1$ forming an impedance $Z_1$, and that the phase shift $\phi_1$ between the first current $I_1$ and the voltage across the impedance $Z_1$ serves as the phase shift.

2. Apparatus according to claim 1 characterized in that the capacitive element $C_1$ is of such a value that the phase shift $\phi_1$ is approximately of the value $\phi = 45°$ in the absence of coins or in the presence of a coin of a predetermined kind.

3. Apparatus according to claim 1 characterized in that a further capacitive element $C_2$ is connected between the coil and the second current or voltage source, the coil and the further capacitive element $C_2$ forming a second impedance $Z_2$, and that the phase shift $\phi_2$ between the second current and the voltage across the second impedance $Z_2$ serves as a criterion for acceptance or rejection of the coin.

4. Apparatus according to claim 1 characterized in that a further capacitive element $C_2$ is connected between the coil and the second current or voltage source, the coil and the further capacitive element $C_2$ forming a series resonance circuit, and that the second current or voltage source operates the series resonance circuit in resonance.

5. Apparatus according to claim 1 characterized in that the value of the impedance $Z_1$ also serves as a criterion for acceptance or rejection of the coin.

6. Apparatus according to one of the claims 1 to 5 characterized in that the frequency of the first current is in the region of 1 to 10 kHz.

7. Apparatus according to one of the claims 1 to 5 characterized in that the frequency of the second current is in the region of 50 kHz to 5 MHz.

8. Apparatus according to one of the claims 1 to 5 characterized in that the inductive measuring element is formed by the coil which is arranged on the one side wall of a coin passage and by a metal plate arranged on the oppositely disposed side wall of the coin passage.

9. Apparatus according to one of the claims 1 to 5 in that a lower and an upper side wall of a coin passage are inclined relative to vertical and that the coil of the inductive measuring element is a double coil comprising two individual coils which are arranged on the lower and the upper side walls of a coin passage and which are wound in opposite directions and electrically connected in series.

10. Apparatus according to one of the claims 1 to 5 characterized in that a lower and upper side wall of a coin passage are inclined relative to vertical, that the coil of the inductive measuring element is a double coil comprising two individual coils which are arranged on the lower and the upper side walls of a coin passage and which are wound in opposite directions and electrically connected in series and that the individual coil arranged on the lower side wall is wound with low-resistance stranded wire.

* * * * *